United States Patent [19]

McGlynn et al.

[11] Patent Number: 5,534,700

[45] Date of Patent: Jul. 9, 1996

[54] OPTICAL SPECTROMETER SYSTEM HAVING A CURVED REFLECTIVE IMAGING SLIT BODY

[75] Inventors: Charles L. McGlynn, Brookfield; Ker L. Shu, New Milford, both of Conn.

[73] Assignee: Hughes Aircraft Company, Los Angeles, Calif.

[21] Appl. No.: 279,725

[22] Filed: Jul. 25, 1994

[51] Int. Cl.$^6$ ........................................ G01J 5/06
[52] U.S. Cl. ............... 250/353; 250/339.07; 250/352
[58] Field of Search ............................. 250/352, 339.07, 250/353

[56] References Cited

U.S. PATENT DOCUMENTS 4,820,923  4/1989  Wellman ................................ 250/352
5,422,483  6/1995  Ando et al. ......................... 250/339.02

Primary Examiner—Constantine Hannaher
Attorney, Agent, or Firm—W. C. Schubert; W. K. Denson-Low

[57] ABSTRACT

An optical spectrometer system that includes an optical element having a two-dimensional, curved, reflective, low emissivity slit body, or surround, in which an imaging slit is formed. The optical spectrometer system includes a detector, such as an infrared detector, for example, disposed in a cavity at a focal plane thereof, an optical system in the cavity for focusing radiation onto the detector, and an entrance pupil disposed in the cavity. The curved slit body effectively and substantially eliminates out-of-field radiation from impinging upon the slit body, and its low emissivity greatly reduces self-emission from the slit body. The reflective slit body is a low emissivity element that images the detector back upon itself and passes background energy that falls within a cone defined by the entrance pupil. By using the two-dimensional curved slit body, a relatively small detector dewar or focal plane cooler may be employed in the optical spectrometer system to cool the detector. The two-dimensional curved slit body emits less than three percent of in-field radiation and permits virtually none of the radiation derived from walls of the cavity from being imaged at the detector. The curved slit body preferably has a torroidal shape, and is formed so that central rays are normal to the slit body at all points. The curved slit body images the detector back upon itself, thus minimizing background effects. Use of the curved slit body eliminates the need to cool the slit body and walls of the cavity.

14 Claims, 1 Drawing Sheet

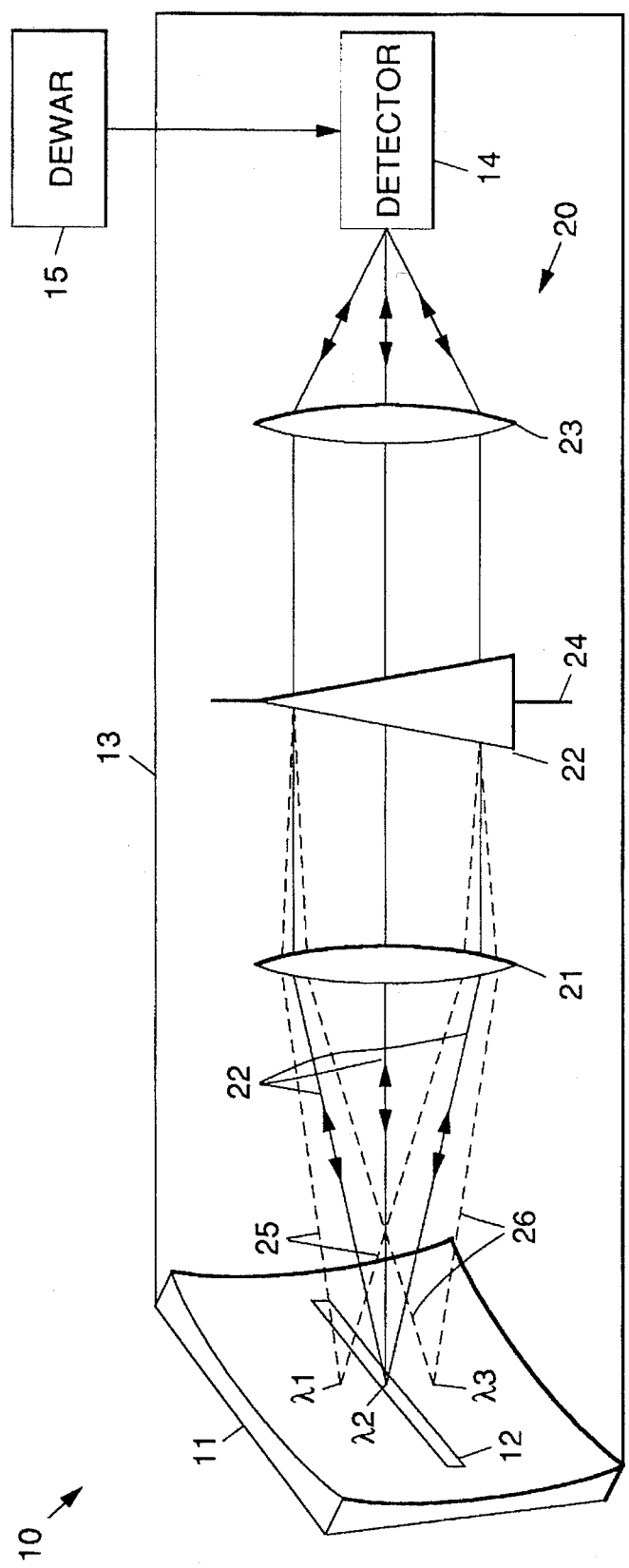

OPTICAL SPECTROMETER SYSTEM HAVING A CURVED REFLECTIVE IMAGING SLIT BODY

BACKGROUND

The present invention relates generally to optical spectrometer systems, and more particularly, to an optical spectrometer system that employs a two-dimensional curved slit body surrounding an imaging slit that minimizes reflected background energy impinging upon a detector of the system.

Prior art relating to the present invention includes dispersive optical infrared spectrometers that use either prisms or gratings, for example. Typically, in a dispersive optical system having a detector and an imaging slit onto which the detector is focussed, and which is designed to operate within the infrared region of the optical spectrum, the imaging slit is cooled to minimize background effects caused by the system, and to reduce the background observed by the detector, either caused by transmitted or reflected energy. Cooling requires that the slit be placed in a vacuum dewar that is connected to a cryogen source, both of which are expensive.

Prior systems typically cool both the focal plane (detector) and the slit. In some systems, two vacuum dewars or one complex dewar incorporating the slit and the focal plane have typically been used. In other systems, one large or two smaller cryogenic coolers have been used to cool slit and focal plane. Furthermore, special materials and designs have also been required to maintain system alignment from room temperature down to operational temperature.

For example, prior systems have used a low reflectivity, high emissivity, flat slit surround that introduces a small percentage of the radiation from cavity wall. However, all of the in-field radiation from the slit surround plus the wall contribution is imaged at the focal plane. Another prior an system uses a high reflectivity, low emissivity flat slit surround or body that reduces the radiation from the slit surround and increases the contribution from the cavity walls. These two embodiments require that the slit surround or body and the cavity walls be cooled to minimize background effects.

In view of the above, it would be desirable to have a low emissivity slit body that surrounds an imaging slit that minimizes background energy received by the detector. It is therefore an objective of the present invention to provide for an optical imaging system that employs a two-dimensional curved slit body surrounding a spectrometer slit that minimizes reflected background energy impinging upon a detector of the system.

SUMMARY OF THE INVENTION

In order to meet the above and other objectives, the present invention comprises an optical spectrometer system that includes an optical element comprising a two-dimensional, curved, reflective, low emissivity slit body, or surround, in which an imaging slit is formed. The optical spectrometer system comprises a detector, such as an infrared detector, for example, disposed in a cavity at a focal plane thereof, an optical system disposed in the cavity for focusing radiation onto the detector, and an aperture stop disposed in the cavity.

The curved-shaped slit body effectively and substantially eliminates out-of-field radiation from impinging upon the detector, and the low emissivity body greatly reduces self-emission from the slit body. The reflective slit body is a low emissivity element that images the detector back upon itself and passes only that portion of the background energy that falls within a cone defined by the aperture stop. By using the two-dimensional curved slit body, a relatively small detector dewar or focal plane cooler may be employed in the optical imaging system as compared to conventional systems.

The high reflectivity, low emissivity two-dimensional curved slit body emits less than three percent of the in-field radiation and permits virtually none of the radiation derived from the cavity walls from being imaged at the focal plane. The curved slit body is formed so that central rays for different wavelengths are normal to the slit body at all points. The curved slit body preferably comprises a toroidal shaped, highly reflective, low emissivity slit body. The curved slit body images the detector back upon itself, thus minimizing background effects. Use of the curved slit body eliminates the need to cool the slit body and walls of the cavity.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole FIGURE of the drawing illustrates an optical spectrometer system employing a two-dimensional, curved, reflective, low emissivity slit body or surround in accordance with the principles of the present invention.

DETAILED DESCRIPTION

Referring to the drawing FIGURE, it illustrates an optical spectrometer system 10 employing a curved optical element 11 comprising a two-dimensional, curved, reflective, low emissivity slit body 11, or surround 11, in accordance with the principles of the present invention through which an imaging slit 12 is disposed. The optical spectrometer system 10 comprises a cavity 13 having the slit body 11 disposed at one end and a detector 14 disposed at the other end. The detector 14 is located at a focal plane of the optical spectrometer system 10. A dewar 15 or other cooling means 15 is coupled to the detector 14 in order to cool it to a low temperature. The detector 14 may be a cooled infrared detector, for example.

An optical system 20 is disposed within the cavity 13 that comprises first and second lenses 21, 23 having a prism or grating 22 disposed therebetween, and an entrance pupil 24 which is the image of a cold stop inside the dewar 15. The optical system 20 is employed to image radiation onto the detector 14 located at the focal plane of the optical spectrometer system 10. It is to be understood that the specific embodiment of the optical system 20 shown in the drawing FIGURE is for the purposes of illustration only, and is not to be taken as limiting. Clearly other optical designs may be used to image radiation onto the detector.

The two-dimensional, curved, reflective, low emissivity slit body 11, or surround 11, is designed to allow radiation passing through the slit 12 to the detector 14. The slit body 11 is also designed to image radiation emitted by the detector 14 (at the focal plane) back upon itself. The curved slit body 11 effectively and substantially eliminates out-of-field radiation from impinging upon the detector 14. The low emissivity curved slit body 11 greatly reduces self-emission from the slit body 11. The reflective slit body 11 provides a low emissivity slit surround that images the detector 14 back upon itself and passes only that portion of background energy that falls within a cone defined by the aperture stop 24. By using the two-dimensional curved slit body 11, a relatively small detector dewar 15 or focal plane cooler may be employed in the optical spectrometer system 10 as compared to conventional systems.

The high reflectivity, low emissivity two-dimensional curved slit body 11 is designed to emit less than three percent of the in-field radiation and permit virtually none of the radiation derived from walls of the cavity 13 from being imaged at the focal plane and onto the detector 14. The curved slit body 11 is formed so that central rays for different wavelengths (identified in the drawing FIGURE as $\lambda 1$, $\lambda 2$, $\lambda 3$) are normal to the slit body 11 at all points. The entrance pupil 24 prevents rays other than those that are substantially normal to the slit body 11 from impinging upon the detector 14. These non-normal rays include those emitted from the cavity walls and area surrounding the detector 14, for example. The curved slit body 11 preferably has a toroidal shape. The curved slit body 11 images the detector 14 back upon itself, thus minimizing background effects. Use of the curved slit body 11 eliminates the need to cool the slit body 11 and walls of the cavity 13.

Thus there has been described new and improved optical spectrometer system and two-dimensional curved slit body surrounding an spectrometer slit that minimizes reflected background energy impinging upon a detector of the system. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Optical apparatus comprising:

an optical cavity;

an optical spectrometer system disposed within the cavity;

a detector disposed at a first end of the cavity and located at a focal plane of the optical spectrometer system;

cooling means coupled to the detector for cooling it to a predetermined low temperature;

an entrance pupil disposed within the cavity; and a two-dimensional, curved, reflective, low emissivity slit body comprising an spectrometer slit disposed at a second end of the cavity whose curved shape images radiation emitted by the detector back upon itself, and wherein the curved slit body substantially eliminates out-of-field radiation from impinging upon the detector and greatly reduces self-emission from the slit body.

2. The optical apparatus of claim 1 wherein the curved slit body is formed so that central rays transmitted by the optical spectrometer system to the detector are normal to the slit body at all points.

3. The optical apparatus of claim 1 wherein the curved slit body comprises a toroidal shaped, highly reflective, low emissivity slit body.

4. The optical apparatus of claim 1 wherein the optical spectrometer system comprises first and second lenses having a prism disposed therebetween.

5. The optical apparatus of claim 1 wherein the optical spectrometer system comprises first and second lenses having a grating disposed therebetween.

6. The optical apparatus of claim 1 wherein the detector comprises a cooled infrared detector.

7. Infrared optical apparatus comprising:

an optical cavity;

an optical spectrometer system disposed within the cavity;

an infrared detector disposed at a first end of the cavity and located at a focal plane of the optical spectrometer system;

cooling means coupled to the infrared detector for cooling it to a predetermined low temperature;

an entrance pupil disposed within the cavity; and a two-dimensional, curved, reflective, low emissivity slit body comprising an spectrometer slit disposed at a second end of the cavity whose curved shape images radiation emitted by the infrared detector back upon itself, and wherein the curved slit body substantially eliminates out-of-field radiation from impinging upon the infrared detector and greatly reduces self-emission from the slit body.

8. The infrared optical apparatus of claim 7 wherein the curved slit body is formed so that central rays transmitted thereby are normal to the slit body at all points.

9. The infrared optical apparatus of claim 7 wherein the curved slit body has a toroidal shape.

10. The infrared optical apparatus of claim 7 wherein the optical spectrometer system comprises first and second lenses having a prism disposed therebetween.

11. The infrared optical apparatus of claim 7 wherein the optical spectrometer system comprises first and second lenses having a grating disposed therebetween.

12. An optical element for use with an optical apparatus that comprises an infrared detector disposed in a cavity at a focal plane thereof, an optical spectrometer system disposed within the cavity for focusing radiation onto the detector, and an entrance pupil disposed within the cavity, said optical element comprising:

a two-dimensional, curved, reflective, low emissivity slit body having an spectrometer slit formed therein for allowing the radiation passing through the slit to be focused onto the infrared detector by the optical spectrometer system and wherein the shape of the curved slit body is selected to substantially image radiation emitted by the infrared detector back upon itself through the optical spectrometer system, and wherein the curved slit body substantially eliminates out-of-field radiation from impinging upon the infrared detector and greatly reduces self-emission from the slit body.

13. The optical element of claim 12 Wherein the curved slit body is formed so that central rays transmitted by the optical spectrometer system to the detector are normal to the slit body at all points.

14. The optical element of claim 12 wherein the curved slit body has a toroidal shape.

* * * * *